April 20, 1943.  C. ADLER, JR  2,316,751
LANDING INDICATOR
Filed June 20, 1942  2 Sheets-Sheet 1
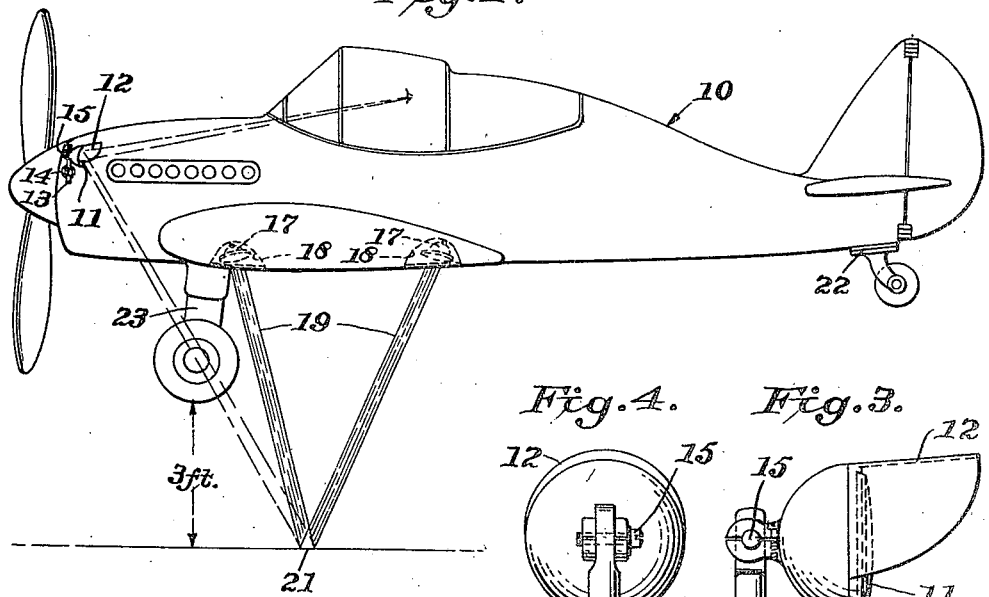
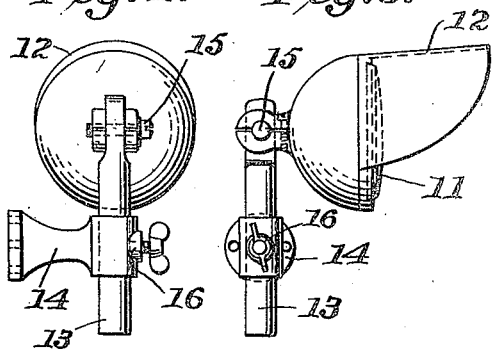
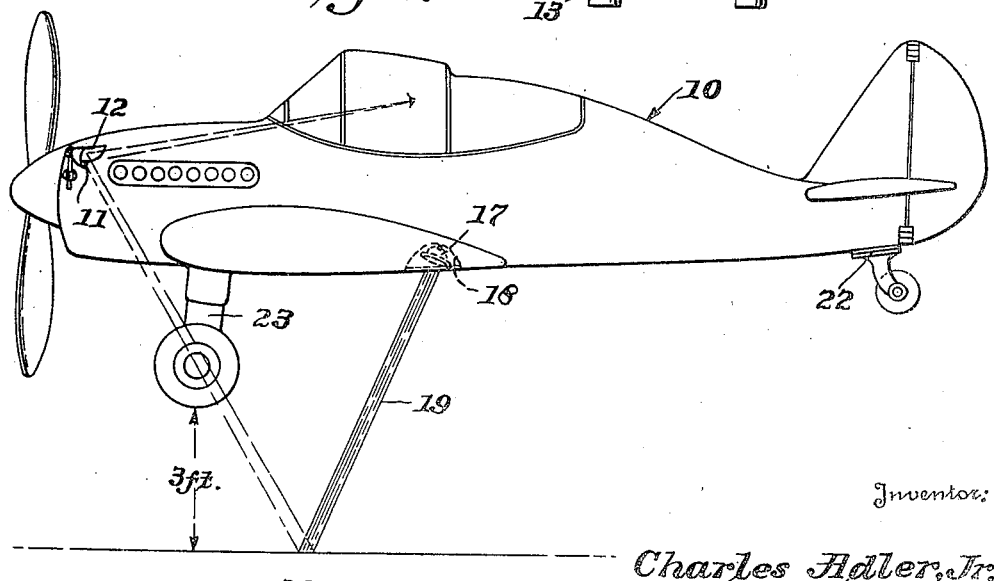
Inventor:
Charles Adler, Jr.
By Cushman, Darby & Cushman
Attorneys

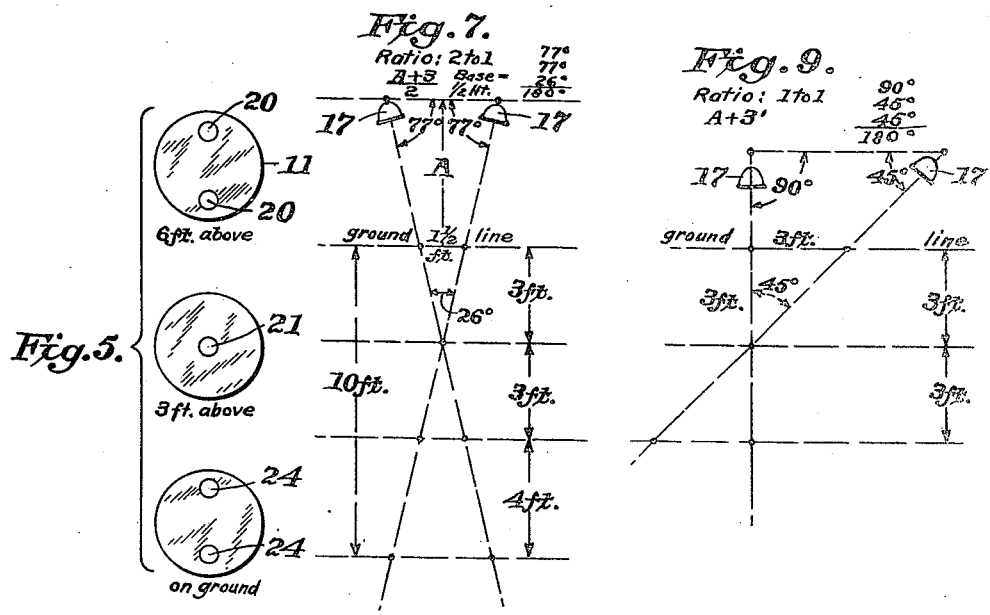
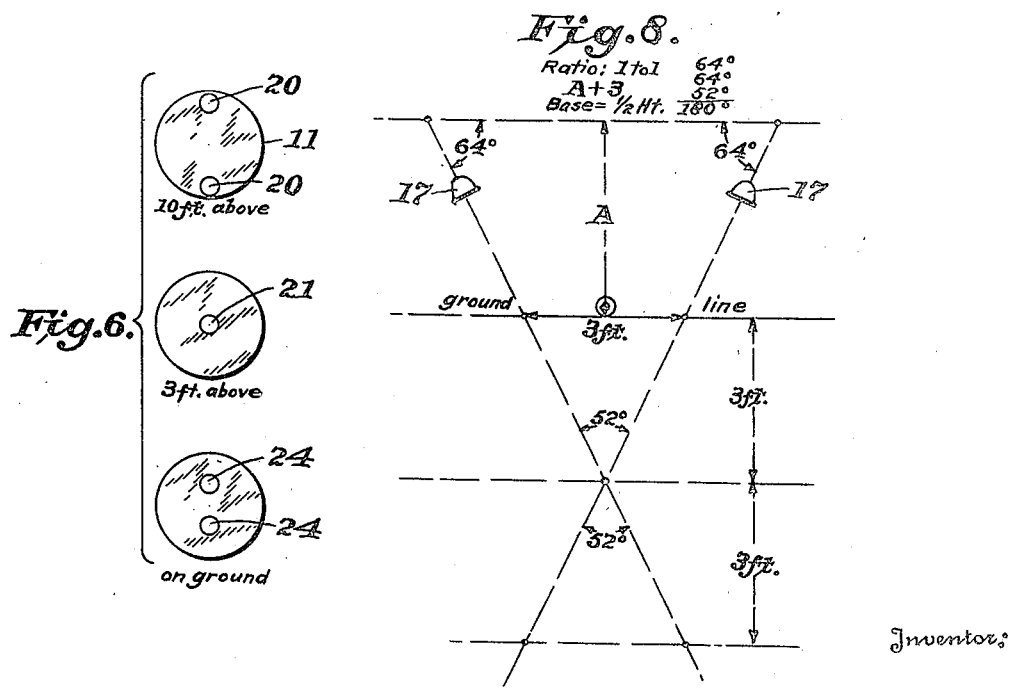

UNITED STATES PATENT OFFICE 2,316,751

LANDING INDICATOR

Charles Adler, Jr., Baltimore, Md.

Application June 20, 1942, Serial No. 447,814

3 Claims. (Cl. 88—1)

This invention relates to means for insuring safe and accurate landing of aircraft at night particularly when the landing is being made at an unlighted air field, but is equally useful in the case of airfields having the customary illumination and markings. The invention, after a series of flight tests, has been found to possess numerous advantages and for the first time provides a simple and dependable means for increasing the safety factor in connection with night landings.

Night landings, even with the aid of landing lights, require a great deal of skill. There is an element of danger because the pilot does not know how far the wheels of his ship are above the ground and he must "feel" the precise time to make the actual contact with the ground. Judgment in this regard is rendered the more difficult because depth perception is distorted at night and many accidents have occurred by pilots leveling off too soon and "dropping in," or by leveling off too late and nosing over.

The primary object of this invention is to provide a reliable indication to the pilot of a descending aircraft when the ship is a predetermined distance from the ground of a landing field, i. e., a critical distance which is not indicated by the usual altimeter, for example, when the wheels are in the neighborhood of three feet, more or less, above the ground.

An equally important object of the invention is to provide means for presenting the indication without requiring the pilot to divert his visual attention from the ground upon which the aircraft is about to land.

Another object of the invention is to assure the constant accuracy of the indication by locating the means for producing the indication as close as possible to the lateral axis or center of gravity of the plane where it is subjected to a minimum of movement about a transverse axis. That is, I provide means carried by the aircraft for projecting downwardly and laterally of the ship a plurality of intersecting pencil beams of light. These beams form illuminated spots upon the ground, such spots being spaced apart until a predetermined elevation is reached when they merge into a single spot. The single spot is produced only at a predetermined level. In some cases, one beam is used producing a single illuminated ground spot likewise visible only when the predetermined level is reached. The single indicating illuminated ground spot is always within the confines of planes projected downwardly from the two ends of the aircraft.

An additional object of the invention is to provide means such as a convex mirror carried by the aircraft which will reflect the image of the said illuminated ground spot in a manner to present the same to the pilot while allowing him to concentrate his eyes ahead and upon the landing field. In other words, the image of the illuminated ground spot is always displayed in the direct line of vision of the pilot to give a positive indication of the height of the landing wheels from the ground when the plane is being landed.

An important feature of the invention and one which contributes to checking of the operation of the indicator resides in having the spaced illuminated spots on the ground reflected in the mirror when the aircraft is approaching the critical height as spaced images disposed off center. These images converge into a single central image, being the reflection of the single illuminated spot when the beams intersect at the ground. When the aircraft has landed, or is about to take off, spaced illuminated spots are presented on the ground and the spacing provides a reliable indication that the beams will intersect on the ground when the wheels are a predetermined critical height above the ground.

A substantial advantage of the invention resides in disposing the indicator light projecting means so that the beams at no time will conflict with the usual landing lights provided on conventional aircraft, and in this connection the electrical energy consumed by the indicator lights is substantially less than that of the landing lights, whereby they may be used for extended periods without causing appreciable drain on the battery.

In the operation of the invention as observed in the aforementioned actual flight tests the indicating mirror or other indicating means only becomes effective as the aircraft in its descent approaches a critical height. For example, assuming the critical height to be three feet, the mirror remains dark until a height in the neighborhood of 6 to 10 feet is reached, at which time eccentrically disposed spaced images appear and merge continuously into the central and single image as the critical predetermined height of three feet is reached.

The apparatus may be incorporated upon aircraft now in use as well as aircraft in production without substantial modification or expense, and does not add appreciable weight or drag. Moreover, the construction is free of moving parts as well as complicated electrical circuits or mechanisms.

In projecting the beams, the angles should be such that they extend laterally of the aircraft whereby the spots or spot will be reflected by the mirror while the aircraft is on the ground and while it is ascending as well as descending through a predetermined height constituting the critical zone, e. g., in the case of the critical height of three feet, this zone will possibly comprehend substantially ten feet.

In traveling through this zone during descent to the critical height the ground spots will continuously move toward each other to form the single image in the central portion of of the mirror, (1) because the light sources and the mirror are fixed with relation to each other and therefore move together, and (2) because of the disposition of the light sources as close to the lateral axis of the aircraft as possible. This construction decreases the possibility of error such as occurs when the beams are projected longitudinally of and in advance of the aircraft, because in such construction as the nose is being constantly pulled up, i. e., the aircraft is being moved about its lateral axis in making a landing, two situations arise which contribute to a false indiction, namely, (1) the beams are constantly lengthened, although altitude is decreasing, and the distance of the spots apart constantly increases and (2) reciprocation of the aircraft about its lateral axis will result in alternate lengthened and shortened beams to the confusion of the pilot. While the provision of moving parts might overcome these difficulties to some extent such expedients must be avoided since they increase the hazard and must be called into play in an all too brief an interval occasioned by the aircraft being close to the ground. In addition to introducing another jeopardizing element in the form of a delicate balancing mechanism the moving compensating mechanism creates additional weight and servicing requirements.

In the accompanying drawings, I have shown for purposes of illustration, several embodiments of the invention, and it will be understood various modifications may be made within the scope of the appended claims.

Referring to the drawings:

Figure 1 is a side elevation of an aeroplane, utilizing two beams with cooperating convex mirror;

Figure 2 is a side elevation of an aeroplane, utilizing one beam with cooperating convex mirror;

Figure 3 is a side elevation of the adjustable mirror mounting;

Figure 4 is a rear elevation of the adjustable mirror mounting;

Figure 5 is a diagrammatic showing of the critical zone using the two beams and illustrating the spaced position of the spots as they appear in the mirror when the plane is six feet above the ground, the central single spot when the plane is three feet above ground, and the spaced spots when the plane is on the ground;

Figure 6 is a similar diagrammatic view of a critical zone wherein the position of the spots in a ten-foot zone is shown;

Figure 7 illustrates diagrammatically the indications when the beams are projected at 77° to the horizontal, it being noted that the distance between the spots when the plane is on the ground is one and one-half feet, which is an accurate measurement or indication that the beams will intersect and form a single spot at three feet;

Figure 8 is a similar view showing the beams projected at 64°, and

Figure 9 is a similar view showing one beam projected at 90° and the other at 45° to the horizontal.

In Figure 1, the aeroplane is indicated at 10 and has fixed preferably to the nose of the ship, a convex mirror 11 provided with a protecting shield 12. This mirror is disposed so as to be in the direct line of vision of the pilot at all times and specifically when he is making a landing, so that it is unnecessary for the pilot to divert his attention from the landing field in order to see the indications in the mirror. The mirror is carried on a stem 13 which is mounted on a bracket 14 fixed to the ship. The mirror is pivotally adjustably connected with the stem as shown at 15, for adjustment about a horizontal axis and the stem is mounted for rotary and vertical movement on the bracket as shown at 16, whereby the mirror can be focused to any desired angle. This mirror is relatively small and adds little weight or drag.

The indication producing means consists of a pair of light sources 17 disposed as close to the horizontal axis of the aircraft as possible, so that in landing the ship, there is substantially no likelihood of a false indication being given since there is less displacement about the horizontal axis and the mirror and the light sources are carried by the plane and move together as a unit. This is not the case where the beams are projected longitudinally of the ship and in advance of the ship since under such circumstances, in making a landing, the aircraft is being constantly moved about its lateral axis and the longitudinally projected beams are constantly lengthened, although altitude is decreasing and the distance of the spots apart constantly increases with the result that alternate lengthened and shortened beams are projected in advance of the ship and lead to a confused and unreliable indication.

The light sources are disposed in suitable countersunk housings 18 at any suitable point of the ship, but preferably on the wing, whereby the light beams can be projected downwardly and laterally of the ship and toward each other so as to intersect and produce a spot or spots on the ground which will be reflected in the mirror when the plane is descending through the critical zone. The ground spots may be visible to the pilot, but are always within vertical planes defined by the extremities of the ship. That is, the reflectors for the lights are disposed so as to project the beams laterally clear of the ship and at an angle to the longitudinal axis thereof and downwardly upon the ground whereby the reflected image of the illuminated ground spots or spot may be presented in the mirror, and at the same time, relatively short beams are used as compared to beams projected longitudinally and in advance of the ship.

The beams are indicated at 19, and are preferably of pencil character. The lamps employ a substantially reduced wattage as compared with the usual landing lights, so that the indicating beams may be used for a considerable period without a serious drain upon the battery. Also it will be observed that the beams 19 are of a character and are so projected as to not conflict with the landing lights.

Referring to Figures 5 to 9, and assuming that the plane is landing and is about six feet from the ground, the illuminated ground spots will be spaced apart, and the mirror will be so focused as to pick up these spaced spots 20 and present them in the mirror without requiring the pilot to divert his attention from the ground ahead. As the plane passes through the critical landing stage of six feet, the spots continuously come closer together on the ground until at three feet, they merge into a single illuminated spot 21, the image of which is displayed centrally in the mirror and indicates to the pilot that he is at the critical distance for stalling off. When the plane is landed it is not horizontal, since the rear wheel support 22 is shorter than the landing wheel supports 23, and separated spots 24 are formed on the ground and presented in the mirror. The distance apart of these spots when the plane is on the ground is an accurate measurement that the indication will be operative within the critical zone, i. e., the spots will merge when the plane is at a three foot elevation into a single central indicating spot.

In Figure 17 the light sources are directed downwardly and laterally of the ship and the angles of the beams are each directed at 77° to a line passing through the light sources when the plane is in level flight. When the plane is on the ground the spots are one and one-half feet apart which is an indication to the ground crew as well as the pilot that the beams will intersect and form a single spot at three feet.

In Figure 8 the beams are directed downwardly at 64° to the horizontal so that on the ground the spots are spaced three feet apart which is an indication that the beams will intersect and form a single illuminated ground spot when the aircraft is three feet above the ground.

In Figure 9 one of the beams is directed laterally and downwardly perpendicular to the horizontal and the other beam is directed at a 45° angle. On the ground the spots are three feet apart which is an indication that the single indicating spot will be produced by intersecting of the beams when the descending plane is three feet above the ground.

The disclosure in Figure 6 shows the indications which appear in the mirror when the critical zone is ten feet. The invention is operative through various critical zones and will assure an accurate indication when the aircraft is a critical distance above the ground.

In Figure 2 is shown a single beam 19 which is so disposed as to be only visible in the mirror when the plane is travelling through the critical zone. When the illuminated ground spot appears as a central image on the mirror the pilot knows that he is at the critical distance above the ground for stalling off and making contact with the ground. When the aircraft is without the critical zone no indication or image appears in the mirror.

It will thus be seen that the invention affords an accurate means carried by the aeroplane for aiding the landing of aircraft at night without dependence upon complicated mechanisms or devices which employ moving parts. It is simply necessary that two intersecting beams or a single beam be employed to produce an illuminated ground spot which will be picked up by the mirror and displayed to the pilot at the critical time without requiring him to divert his attention from the landing field to which the plane is descending. At the same time, no opportunity is given for a confused signal to be given nor does the indication conflict in any way with the usual landing lights.

I claim:

1. In an aeroplane, means carried by the aircraft for producing an illuminated spot on the ground disposed substantially within the confines of planes projected downwardly from the two ends of the aircraft when the wheels are within a critical zone of about 10 feet or less off the ground, and a mirror carried by the nose of the aircraft and disposed directly in the path of vision of the pilot when the plane is in said critical zone and being landed, the mirror being so positioned that the reflected beam from said ground spot is reflected by the mirror and visibly presented to the pilot only when the aircraft passes through said critical zone thereby advising the pilot of his position while allowing him to concentrate his eyes ahead and upon the landing field.

2. In an aeroplane according to claim 1 in which the spot is formed by a single beam projected from a point adjacent the lateral axis of the aeroplane.

3. In an aeroplane according to claim 1 in which the spot is formed by intersecting beams projected from spaced points adjacent the lateral axis of the aeroplane.

CHARLES ADLER, Jr.